United States Patent
Xu et al.

(10) Patent No.: US 10,135,602 B2
(45) Date of Patent: *Nov. 20, 2018

(54) METHOD, APPARATUS, AND SYSTEM FOR TIME SYNCHRONIZATION OF XDSL

(71) Applicant: Huawei Technologies Co., Ltd., Shenzhen, Guangdong (CN)

(72) Inventors: Guijin Xu, Shenzhen (CN); Guozhu Long, Santa Clara, CA (US); Ruijie Xiao, Shenzhen (CN); Zhilei Zhao, Shenzhen (CN); Xuyong Wu, Shenzhen (CN); Yuchen Jia, Santa Clara, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

This patent is subject to a terminal disclaimer.

(21) Appl. No.: 13/761,568

(22) Filed: Feb. 7, 2013

(65) Prior Publication Data

US 2013/0148710 A1 Jun. 13, 2013

Related U.S. Application Data

(63) Continuation of application No. 13/184,276, filed on Jul. 15, 2011, now Pat. No. 8,442,175, which is a
(Continued)

(30) Foreign Application Priority Data

Jan. 16, 2009 (CN) .......................... 2009 1 0105103

(51) Int. Cl.
*H04L 7/00* (2006.01)
*H04M 11/06* (2006.01)
*H04J 3/06* (2006.01)

(52) U.S. Cl.
CPC .......... *H04L 7/0041* (2013.01); *H04J 3/0638* (2013.01); *H04M 11/062* (2013.01)

(58) Field of Classification Search
CPC .......... H04J 3/06; H04J 3/0635; H04J 3/0638; H04M 11/062; H04L 7/0041
(Continued)

(56) References Cited

U.S. PATENT DOCUMENTS 6,137,839 A 10/2000 Mannering et al.
6,553,066 B1 4/2003 Pollet
(Continued)

FOREIGN PATENT DOCUMENTS

CN 1282477 A 1/2001
CN 101075848 A 11/2007
(Continued)

OTHER PUBLICATIONS www.thefreedictionary.com/approximately, retrieved Apr. 1, 2015, 3 pages.*
(Continued)

*Primary Examiner* — David B. Lugo
(74) *Attorney, Agent, or Firm* — Huawei Technologies Co., Ltd.

(57) ABSTRACT

The present invention provides a method, an apparatus, and a system for time synchronization of an xDSL. The method includes: transmitting, by a customer premises equipment, a first symbol to a central office equipment, and obtaining time Ts2 indicating the moment that the first symbol is transmitted; receiving, by the CPE, a second symbol transmitted by the CO, and obtaining time Ts1 indicating the moment that the second symbol is received; obtaining, by the CPE obtains time Tm2 indicating the moment that the first symbol is received by the CO and time Tm1 indicating the moment that the second symbol is transmitted by the CO; the
(Continued)

CPE calculates an offset between a clock of the CPE and a clock of the CO according to Ts1, Ts2, Tm1 and Tm2; and the CPE adjusts the clock of the CPE according to the offset to achieve synchronization.

16 Claims, 7 Drawing Sheets

Related U.S. Application Data continuation of application No. PCT/CN2009/075002, filed on Nov. 18, 2009.

(58) Field of Classification Search
USPC .......................... 375/219, 222, 260, 354, 355
See application file for complete search history.

(56) References Cited

U.S. PATENT DOCUMENTS

| | | | |
|---|---|---|---|
| 6,683,921 B1 | 1/2004 | Shiraishi et al. | |
| 6,697,768 B2* | 2/2004 | Jones et al. | 702/189 |
| 6,697,769 B1* | 2/2004 | Goodman et al. | 703/2 |
| 7,068,746 B1 | 6/2006 | Stichter | |
| 7,602,873 B2* | 10/2009 | Eidson | 375/371 |
| 8,442,175 B2* | 5/2013 | Xu et al. | 375/355 |
| 8,670,439 B2* | 3/2014 | Wei | H04J 3/0638 370/350 |
| 2004/0008661 A1 | 1/2004 | Myles et al. | |
| 2007/0147435 A1* | 6/2007 | Hamilton | G06F 1/14 370/503 |
| 2007/0147562 A1 | 6/2007 | Eidson | |
| 2008/0075128 A1* | 3/2008 | Fourcand | H04J 3/0602 370/520 |
| 2008/0287153 A1 | 11/2008 | Fullam | |
| 2009/0147806 A1 | 6/2009 | Brueckheimer | |
| 2009/0170430 A1* | 7/2009 | Rangan et al. | 455/39 |
| 2009/0276542 A1* | 11/2009 | Aweya | H04J 3/0667 709/248 |
| 2010/0085989 A1* | 4/2010 | Belhadj | H04J 3/0667 370/503 |
| 2012/0263195 A1* | 10/2012 | Li | G04G 7/02 370/510 |

FOREIGN PATENT DOCUMENTS

| | | |
|---|---|---|
| CN | 101098219 A | 1/2008 |
| CN | 101231337 A | 7/2008 |
| CN | 101247169 A | 8/2008 |
| CN | 101425865 A | 5/2009 |
| JP | H11317779 A | 11/1999 |
| JP | 2001308837 A | 11/2001 |
| JP | 2007174680 A | 7/2007 |
| RU | 19981 U1 | 10/2001 |
| WO | 9931850 A1 | 6/1999 |

OTHER PUBLICATIONS www.google.com, approximately—Google search, retrieved Apr. 1, 2015, 1 page.*
Decision on Grant dated Oct. 29, 2012 in connection with Russian Patent Application No. 2011134258/07 (050690).
Office Action dated Feb. 12, 2013 in connection with Korean Patent Application No. 10-2011-7018249.
Office Action dated Mar. 13, 2013 in connection with Chinese Patent Application No. 200910105103.3.
Written Opinion of the International Searching Authority dated Feb. 25, 2010 in connection with International Patent Application No. PCT/CN2009/075002.
Shang-lin Zhao, et al., "Research of Time Synchronization in Digital Substation Based on IEEE 1588", Power System Technology, vol. 32, No. 21, Nov. 2008, p. 97-102.
Supplementary European Search Report dated Apr. 20, 2012 in connection with European Patent Application No. EP 09 83 8135.
Sungwon Lee, "An Enhanced IEEE 1588 Time Synchronization Algorithm for Asymmetric Communication Link using Block Burst Transmission", IEEE Communication Letters, vol. 12, No. 9, Sep. 2008, p. 687-689.
Juha Kannisto, et al., "Software and Hardware Prototypes of the IEEE 1588 Precision Time Protocol on Wireless Lan", Local and Metropolitan Area Networks, Sep. 18, 2005, 6 pages.
International Search Report dated Feb. 25, 2010 in connection with International Patent Application No. PCT/CN2009/075002.
Office Action dated Jun. 22, 2012 in connection with U.S. Appl. No. 13/184,276.
Office Action dated Aug. 24, 2012 in connection with Chinese Patent Application No. 200910105103.3.
Kang Gui, et al., "The Application of Time Synchronization in EPA System", Journal of Wuhan University of Technology, vol. 28, No. 2, Feb. 2006, 5 pages.
Office Action dated Aug. 23, 2012 in connection with Russian Patent Application No. 2011134258/07.
Notice of Reasons for Rejection dated Apr. 2, 2013 in connection with Japanese Patent Application No. 2011-545611.
Notice of allowance issued in corresponding Korean application No. 10-2011-7018249, dated Jun. 27, 2013, total 3 pages.
Search report issued in corresponding European application No. 13178105.6,dated Aug. 28,2013,total 7 pages.
Patent Examination Report No. 1 dated May 10, 2013 in connection with Australian Patent Application No. 2009337606.
Office Action dated Apr. 5, 2013 in connection with Indonesian Patent Application No. W-00201102602.
Office action issued in corresponding Canadian application No. 2749879, dated Jul. 16, 2013, total 3 pages.
ITU-T G.993.2, Very high speed digital subscriber line transceivers 2 (VDSL2); Amendment 3: Support for emergency rate adjustment, specification of test parameter accuracy and other improvements, International Telecommunication Union, Aug. 2008, total 88 pages.

* cited by examiner

US 10,135,602 B2

METHOD, APPARATUS, AND SYSTEM FOR TIME SYNCHRONIZATION OF XDSL

CROSS-REFERENCE TO RELATED APPLICATIONS

This application is a continuation of U.S. patent application Ser. No. 13/184,276, filed on Jul. 15, 2011, which is a continuation of International Application No. PCT/CN2009/075002, filed on Nov. 18, 2009. The International Application claims priority to the Chinese Patent Application No. 200910105103.3, filed on Jan. 16, 2009, both of which are incorporated herein by reference in their entireties.

TECHNICAL FIELD

The present invention relates to the communications field, and more particularly, to a method, an apparatus, and a system for time synchronization of a Digital Subscriber Line (DSL).

BACKGROUND

With emerging of the $3^{rd}$-generation (3G) mobile communication and other advanced digital mobile communication technologies, the number of Femtocell is increasing to meet the requirement. Time synchronization with high accuracy is required for the Femtocell. In general, a clock recovery module is included in a network terminal. Therefore, clock synchronization (i.e., frequency synchronization) is easily to be provided for the Femtocell. However, time synchronization is very difficult to be provided. Some technical issues need to be solved. FIG. 1 is a schematic diagram showing a scheme for achieving accurate time synchronization proposed in the art. Assuming that Offset is an offset between a slave clock and a master clock, Delay1 is a propagation delay from the master clock to the slave clock and Delay2 is a propagation delay from the slave clock to the master clock. Then the following may be known from FIG. 1 that:

$Ts0=Tm1+\text{Offset}$ $Ts1-Ts0=\text{Delay1}$ then, $\text{Offset}=Ts1-Tm1-\text{Delay1}$ similarly, $Tm2=Ts2-\text{Offset}+\text{Delay2}$ so, $\text{Offset}=Ts2-Tm2+\text{Delay2}$ If the delay from the master clock to the slave clock is equal to the delay from the slave clock to the master clock, i.e., Delay1=Delay2, then $$\text{Offset}=(Ts1+Ts2-Tm1-Tm2)/2. \quad (1)$$

In this way, the offset between the slave clock and the master clock is obtained so that the slave clock can be synchronized with the master clock accurately.

However, in the case that an xDigital Subscriber Line (xDSL) device works for mobile backhaul, the Master corresponds to a central office (CO) equipment, and the Slave corresponds to a customer premises equipment (CPE). The channel between the CO equipment and the CPE is complicated, and passes through an analog circuit of the CO equipment, a cable, an analog circuit of the CPE and also digital signal processing circuits at the CO equipment and the CPE. As a result, a downlink delay from the CO equipment to the CPE may not necessarily be equal to an uplink delay from the CPE to the CO equipment; i.e., generally, Delay1 Delay2. According to some measuring results, the difference between Delay1 and Delay2 is more than fps. Therefore, the offset between the CO clock and the CPE clock cannot be derived directly with formula (I).

As shown in FIG. 2, a downstream delay includes a delay $\Delta t1$ of a CO digital transmitting circuit 70, a delay $\Delta t2$ of a CO analog transmitting circuit 203, a downstream delay $\Delta t3$ of a twisted pair 90, a delay $\Delta t2'$ of a CPE analog receiving circuit 205, and a delay $\Delta t1'$ of a CPE digital receiving circuit 80; and a upstream delay includes a delay $\Delta t4$ of a CO digital receiving circuit 75, a delay $\Delta t5$ of a CO analog receiving circuit 2005, an upstream delay $\Delta t6$ of a twisted pair 90, a delay $\Delta t5'$ of a CPE analog transmitting circuit 2003, and a delay $\Delta t4'$ of a CPE digital transmitting circuit 85. In general, Delay1=$\Delta t1+\Delta t2+\Delta t3+\Delta t2'+$Delay2=$\Delta t4+\Delta t5+\Delta t6+\Delta t5'+\Delta t4'$, and the difference between the two delays is generally larger than 1 µs.

An xDSL receiver detects a frame boundary and implements frame synchronization during the initialization. In actual cases, a little error may exist with the synchronization algorithm, and the precision of the synchronization is restricted by the sampling rate and an error of the frame synchronization may affect the accuracy of the time synchronization. If the beginning of a specified frame is recorded as a time stamp Tm1 (at the CO side) or a time stamp Ts2 (at the CPE side) by a transmitter, an error is introduced when a time stamp Ts1 (at the CPE side) or a time stamp Tm2 is recorded by a receiver with an algorithm for frame synchronization. Due to the error of frame synchronization, an error introduced by recording the Ts1 at the CPE side or the Tm2 at the CO side will be very large. In particular, the error will be even larger when the Tm2 is recorded by the CO in the upstream direction with low sampling rate.

Delay1 may also be obtained by directly measuring a downstream channel delay. In this way, an offset between the CO and the CPE can be directly obtained, i.e., Offset=Ts1−Tm1−Delay1. However, at present, the measurement of the xDSL channel delay (especially the twisted pair) is not accurate enough, particularly when loop length is too long, large noises exist in the loop, or bridging taps exist in the loop.

SUMMARY

Embodiments of the present invention can obtain a delay of a channel accurately, correct clock time read by CO equipment and by CPE, and achieve time synchronization between the CPE and the CO equipment by calculating an offset between the clock of the CPE and the clock of the CO equipment.

An embodiment of the present invention provides a method for time synchronization of a digital subscriber line (DSL). The method includes:

transmitting, by a first apparatus, a first symbol to a second apparatus, and obtaining time Ts2 indicating the moment that the first symbol is transmitted;

receiving, by the first apparatus, a second symbol transmitted by the second apparatus, and obtaining time Ts1 indicating the moment that the second symbol is received;

obtaining, by the first apparatus, time Tm2 indicating the moment that the first symbol is received by the second apparatus and time Tm1 indicating the moment that the second symbol is transmitted by the second apparatus;

calculating, by the first apparatus, an offset between a clock of the first apparatus and a clock of the second apparatus according to Ts1, Ts2, Tm1, Tm2, and a delay of the first apparatus; and adjusting, by the first apparatus, the clock of the first apparatus according to the offset to achieve synchronization.

An embodiment of the present invention provides a DSL apparatus. The DSL apparatus includes:

a transmitting unit, configured to transmit a first symbol and obtain time Ts2 indicating the moment that the first symbol is transmitted;

a receiving unit, configured to receive a second symbol transmitted by a second apparatus and obtain time Ts1 indicating the moment that the second symbol is received; and obtain time Tm2 indicating the moment that the first symbol is received by the second apparatus and time Tm1 indicating the moment that the second symbol is transmitted by the second apparatus;

a processing unit, configured to obtain a delay of the DSL apparatus, calculate an offset between a clock of the DSL apparatus and a clock of the second apparatus according to Ts1, Ts2, Tm1, Tm2, and the delay of the DSL apparatus, and adjust the clock of the DSL apparatus according to the offset.

An embodiment of the present invention provides a system for time synchronization of a DSL. The system includes a first apparatus and a second apparatus, where:

the first apparatus transmits a first symbol, and obtains time Ts2 indicating the moment that the first symbol is transmitted;

the second apparatus receives the first symbol, and obtains time Ts1 indicating the moment that the first symbol is received;

the second apparatus transmits a second symbol, and obtains time Tm1 indicating the moment that the second symbol is transmitted;

the first apparatus receives the second symbol, and obtains time Ts1 indicating the moment that the second symbol is received;

the second apparatus transmits the time Tm1 and the time Tm2 to the local terminal;

the first apparatus calculates an offset between a clock of the first apparatus and a clock of the second apparatus according to Ts1, Ts2, Tm1, Tm2, and a delay of the first apparatus; and the first apparatus adjusts the clock of the first apparatus according to the offset to achieve synchronization.

According to the embodiments of the present invention, the problem that an indistinct frame boundary is caused when the frame boundary is recovered through a receiving terminal algorithm can be solved; a synchronization error between a receiving terminal and a transmitting terminal can be calculated according to a specific symbol transmitted by the transmitting terminal, and then a time mark error caused by the indistinct frame boundary can be corrected according to the synchronization error. Meanwhile, an offset between a clock of the CPE and a clock of the CO equipment can be obtained by calculating a delay of a channel so that time synchronization between the clock of the CPE and the clock of the CO equipment can be accurately achieved according to the offset.

DETAILED DESCRIPTION

Hereinafter, the present invention is described clearly with reference to the accompanying drawings.

A first embodiment of the present invention provides a method for time synchronization of xDSL. The method includes the following steps:

transmitting, by a first apparatus, a first symbol to a second apparatus, and obtaining time Ts2 indicating the moment that the first symbol is transmitted;

receiving, by the first apparatus, a second symbol transmitted by the second apparatus, and obtaining time Ts1 indicating the moment that the second symbol is received;

obtaining, by the first apparatus, time Tm2 indicating the moment that the first symbol is received by the second apparatus and time Tm1 indicating the moment that the second symbol is transmitted by the second apparatus;

calculating, by the first apparatus, an offset between a clock of the first apparatus and a clock of the second apparatus according to Ts1, Ts2, Tm1, Tm2, and a delay of the first apparatus; and adjusting, by the first apparatus, the clock of the first apparatus according to the offset to achieve synchronization. In the following embodiments, the first apparatus is taken as a CPE and the second apparatus is taken as a CO; however, it can be understood by people skilled in the art that the first apparatus may also be a CO and the second apparatus may also be a CPE.

When an uplink delay is not equal to a downlink delay, the offset between the clock of the CPE and the clock of the CO is obtained by using a certain mathematic relationship existing between the downstream propagation delay Delay1 and the upstream propagation delay Delay2 so that the CPE (or the CO) can adjust the local clock according to this offset.

Figure 1:
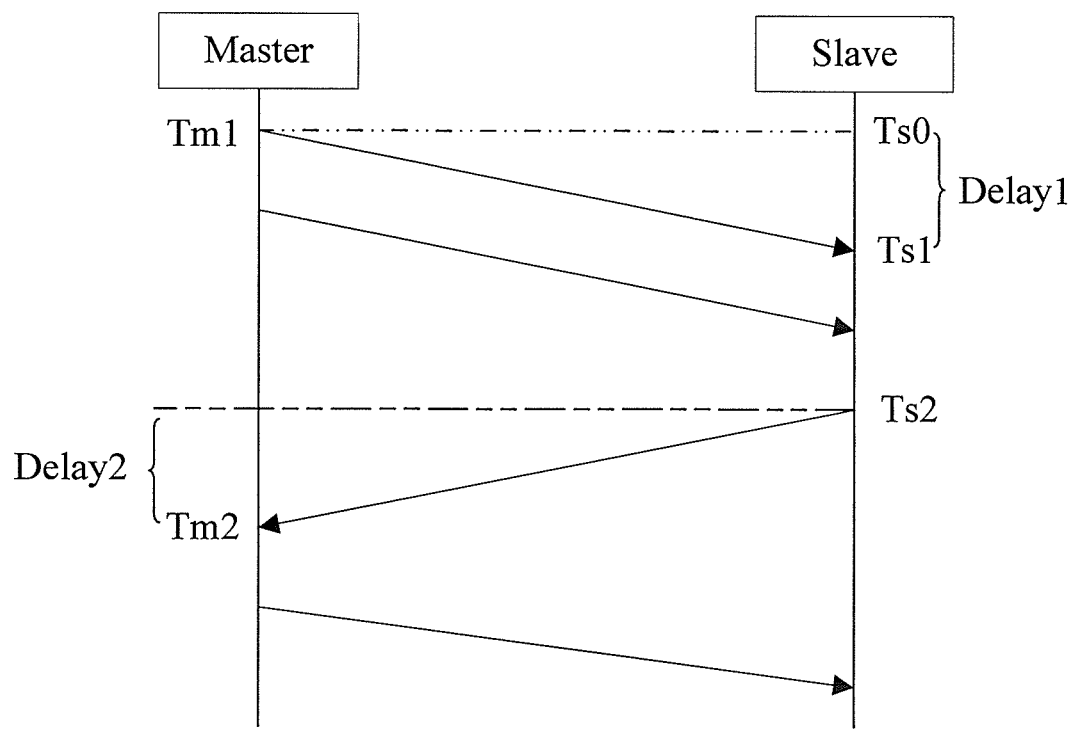
FIG. 1 is a schematic diagram illustrating the principle of time synchronization defined in IEEE 1588v2.
Figure 2:
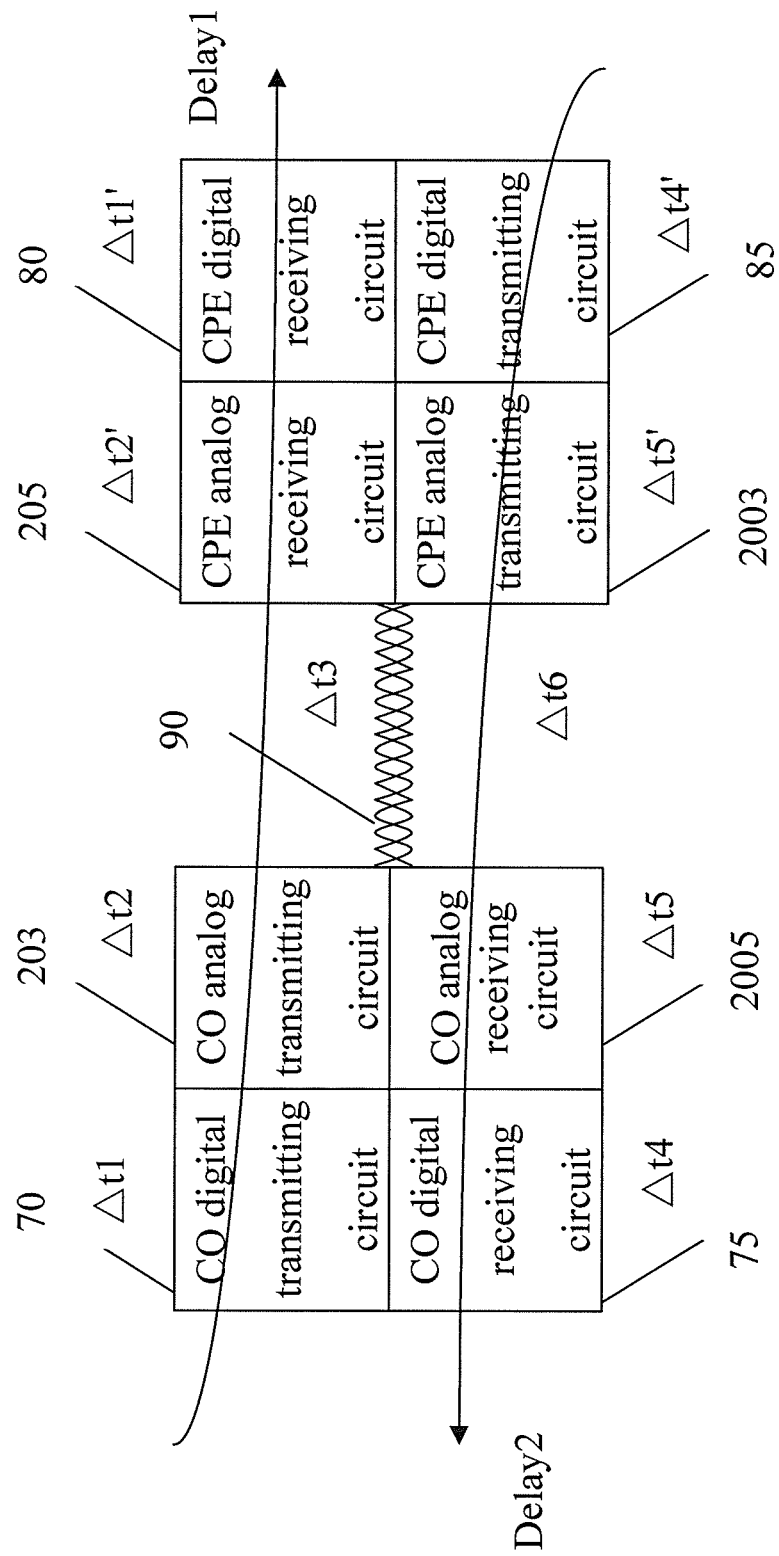
FIG. 2 is a schematic diagram of a downstream propagation delay and an upstream propagation delay.
Figure 3:
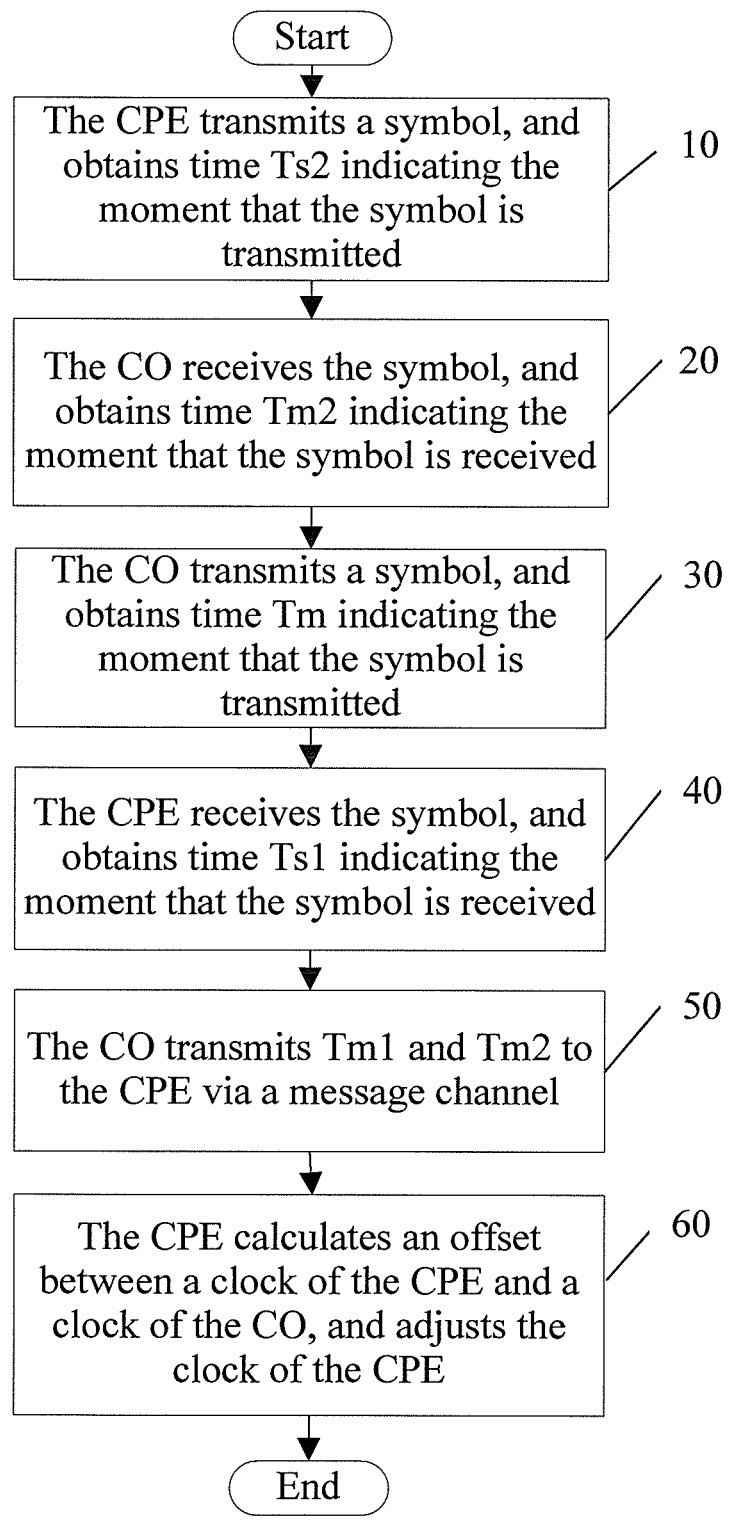
FIG. 3 is a flow chart of a synchronizing method according to a first embodiment of the present invention.

The method for time synchronization according to the first embodiment operates in such a way that the CPE first transmits a sync symbol and then the CO transmits a sync symbol, the specific process of which is shown in FIG. 3.

In step 10, the CPE transmits the first symbol, and obtains time Ts2 indicating the moment that the first symbol is transmitted.

A discrete multi-carrier (DMT) modulating scheme is used in xDSL so that a signal is transmitted in a DMT frame. In this case time synchronization in xDSL is also achieved in DMT frames. Therefore, the first symbol transmitted by the CPE may be a DMT frame, and the specific frame to be chosen is determined through negotiation between the CPE and the CO.

During the initialization, the CPE transmits the first symbol. When a certain position of the first symbol is written into a buffer or a D/A module from the buffer, the CPE records the corresponding time Ts2 of its local clock.

A certain point at which a time stamp is triggered to record is also determined through negotiation between the CO and the CPE. Any position in the first symbol may be used. In the following embodiments, a beginning position of the first symbol is taken as an example.

In step 20, the CO receives the first symbol transmitted by the CPE, and obtains time Tm2 indicating the moment that the first symbol is received.

The CO receives the first symbol transmitted by the CPE. When the CO writes a sample at the beginning position of the first symbol into the buffer or the sample at the beginning position of the first symbol is read by an A/D module from the buffer, the CO records the corresponding time Tm2' of its local clock, (i.e., an action is triggered to obtain a time stamp). Because the CO obtains a frame boundary by calculating with a certain algorithm, an error may be introduced when the beginning position is calculated with the algorithm. In this case, the time Tm2' needs to be corrected by the CO.

According to a phase difference between a receiving point phase and a check point phase of a sinusoidal signal (or a cosinoidal signal) of the first symbol, the CO corrects the time Tm2' to a time Tm2 wherein the time Tm2 is the time indicating the moment that the check point should be received by the CO. The receiving point is a signal point where the first symbol is initially received by the CO, and the check point is a signal point where the first symbol is initially transmitted by the CPE.

When the CO corrects the time Tm2' according to a sinusoidal signal in the first symbol:

a phase of a corresponding point in the sinusoidal signal is fixed (for example, 0°, 45°, 90°, or any other angle) when an action to obtain the time stamp is triggered by the CPE so that this point may be taken as a check point and the phase of the check point is obtained when CO corrects the time Tm2'. In the following embodiments, 0° is taken as an example.

The CO obtains a position of the sinusoidal signal where the CO triggers to obtain a time stamp, where the position is a receiving point where the first symbol is received by the CO, and calculates the time that needs to be taken from the phase of the receiving point to the phase of the check point. Then according to the time, the CO adjusts the time Tm2' to the time Tm2.

The CO may also make the correction by using a plurality of sinusoidal signals in the symbol. When the CPE writes the sample at the beginning position of the first symbol into the buffer or the sample at the beginning position of the first symbol is read from the buffer, each of the sinusoidal signals in the first symbol is just at a specific point. The CO takes these points as check points and knows respective phases of the check points in the sinusoidal signals when the CPE takes the time stamps. For example, a checkpoint in one of the sinusoidal signals is at 0°, one checkpoint is at 90°, one check point is at 45°, and so on.

After receiving the first symbol, the CO obtains a corresponding receiving point from each of the sinusoidal signals, and obtains the phase of the receiving point. Then, the CO calculates the time taken from the phase of the receiving point to the phase of the check point. The time is an offset of a time stamp made by the CO in each of the sinusoidal signals. The phases of these sinusoidal signals can be obtained through the fast Fourier transform (FFT) in the DMT system. In order to improve estimation accuracy and reduce influence of noises, the offset can be the average of the multiple calculations, or estimated with the FEQ coefficient of a trained frequency domain equalizer (FEQ) following the FFT because the compensation of the angle offset can be made by the FEQ. Because an error may be introduced during the DMT frame synchronization there may be an offset between these angles obtained by the CO and the CPE. The offset have a linear relationship with frequencies of the sinusoidal signals, and the slope of the linear relationship directly reflects the frame synchronization error. The offset of each of the sinusoidal signals can be plotted on a coordinate system, and then these offsets are connected by a beeline. The slope of the beeline is just the offset of time stamp taken by the CO due to the synchronization error. Affected by such factors as noises, these angle errors obtained through actual calculation may not be strictly on a beeline. The CO can obtain an optimal beeline for approximation according to a certain optimization algorithm (for example, the least square method) so that the CO can calculate the error of time stamps taken at the far end and corrects the time stamp Tm2' to the time stamp Tm2 according to this error.

Considering the features of the xDSL system, these angle errors may also be obtained by using FEQ information, and then the time Tm2' is adjusted to the time Tm2 in a similar way.

In step 30, the CO transmits a second symbol, and obtains time Tm1 indicating the moment that the second symbol is transmitted.

The CO transmits a second symbol, which may also be a DMT frame. When the CO writes a sample at a beginning position of the second symbol into the buffer or a sample at the beginning position of the second symbol is read from the buffer by a D/A module of the CO, a time value of a local clock at the CO side is taken by the CO (i.e., an action is triggered to obtain the time stamps) and obtains the time Tm1. A specific point, at which the action to obtain the time is triggered, is also determined through negotiation between the CO and the CPE, and any position of the second symbol may be used as a specific point. In the following embodiments, the beginning position of the second symbol is taken as an example.

In step 40, the CPE receives the second symbol transmitted by the CO, and obtains exact time Ts1 indicating the moment that the second symbol is received.

When the sample at the beginning position of the second symbol is written into the buffer or read from the buffer by an A/D module, the CPE triggers an action to obtain the time stamps and records the time value of the local clock at the CPE side as time Ts1'. Because the CPE also calculates the frame boundary by means of a certain algorithm, an error may be introduced in determining the beginning position of the second symbol, and the obtained time Ts1' also needs to be corrected by the CPE.

According to a phase difference between a receiving point phase and a checkpoint phase of a sinusoidal signal (or a cosinoidal signal) in the second symbol, the CPE corrects the time stamp Ts1' to the time stamp Ts1 wherein the time stamp Ts1 is the time indicating the moment that the check point should be received. The receiving point is a signal point where the second symbol is initially received by the CPE, and the check point is a signal point where the second symbol is initially transmitted by the CO.

When the CPE uses one sinusoidal signal in the second symbol, a phase of a corresponding point in this sinusoidal signal is fixed when the CO triggers the action to record the time stamp, so this point in the sinusoidal signal can be taken as a check point and a phase of the point is obtained, for example 0°. Therefore, the CPE may make a correction according to this check point.

The CPE takes the corresponding point of the sinusoidal signal indicating the moment that the second symbol is received by the CPE as the receiving point, and obtains a phase of this point. Then, the CPE calculates the time taken from this phase to a phase of a nearest check point, and adjusts the time Ts1' to the time Ts1 according to the time.

The CPE may also use a plurality of sinusoidal signals in the second symbol. The CPE has known the phases of the corresponding points of these sinusoidal signals when the CO makes the time marks; for example, a corresponding point of one of the sinusoidal signals is at 0°, one is at 90°, one is at 45°, and so on. Therefore, the CPE may take the corresponding point of each sinusoidal signal as a check point. After receiving the second symbol, the CPE obtains the position where the CPE makes a time mark on each of the sinusoidal signals and takes these points as receiving points. Then, the CPE calculates time taken from the phase of a receiving point to the phase of a check point. The time is just an offset of the time mark made by the CPE in each of the sinusoidal signals. Angles of these sinusoidal signals can be obtained through the FFT in the DMT system. In order to improve estimation accuracy and reduce influence of noises, the offset can be obtained through averaging after multiple calculations or through training a frequency domain equalizer (FEQ) after the FFT. Because the FEQ makes compensation for the angle offset, the trained FEQ coefficient may also be used to estimate the angle offset of each of the sinusoidal signals. Because the DMT frame synchronization may have an error, there may be offsets between these angles obtained by the CPE and the CO. These offsets have a linear relationship with frequencies of the sinusoidal signals, and a slope of the linear relationship directly reflects the frame synchronization error. The offset of each of the sinusoidal signals can be plotted on a coordinate system, and these offsets are connected by a beeline; and a slope of the beeline is just the offset of the time marks made by the CPE due to the synchronization error. Affected by such factors as noises, these angle errors obtained through actual calculation may not be strictly on a beeline. Accordingly, the CPE can calculate an optimal beeline for approximation according to a certain optimization algorithm (for example, the least square method). Therefore, the CPE calculates the offset of the time marks made by the CPE and corrects the time Ts1' to the time Ts1 according to the offset.

In step 50, the CPE obtains time Tm2 and time Tm1 of the CO.

The CO transmits the time Tm1 and Tm2 to the CPE via a message channel.

The CPE obtains a propagation delay of the CO and a propagation delay of the CPE.

Figure 4:
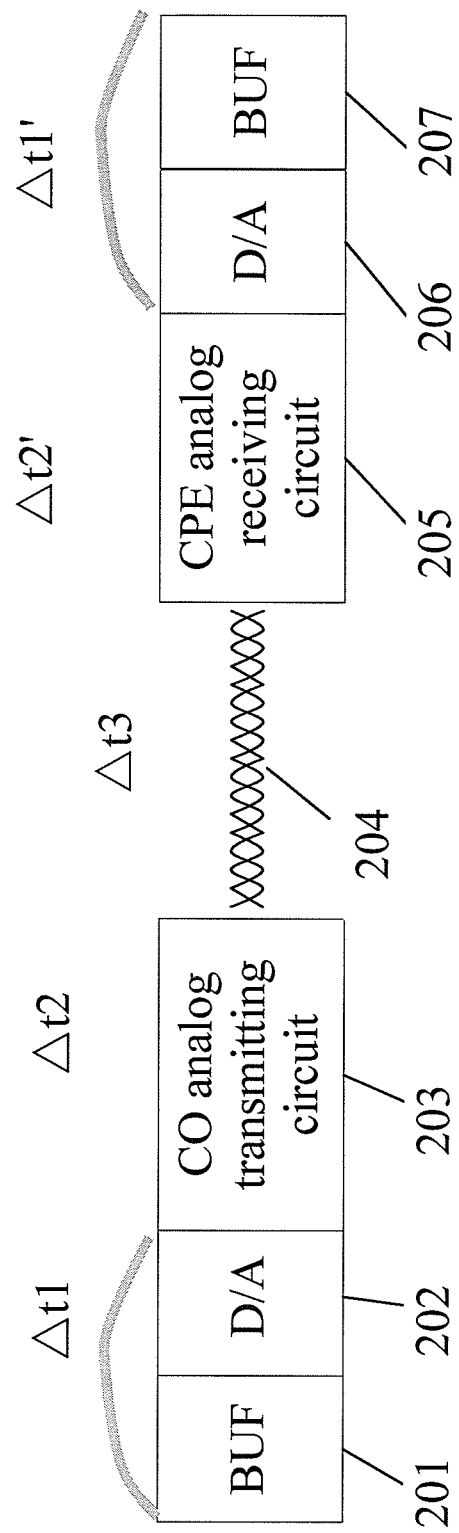
FIG. 4 is a schematic diagram identifying the elements constituting a downstream propagation delay.

A propagation delay from the CO to the CPE is shown in FIG. 4 and includes:

(1) a delay of a CO digital transmitting circuit denoted by $\Delta t1$, which includes a delay of a BUF 201 and a delay of a D/A 202; and a delay of a CPE digital receiving circuit denoted by $\Delta t1'$, which includes a delay of a BUF 207 and a delay of a D/A 206. In some systems, the delays $\Delta t1$ and $\Delta t1'$ are fixed and can be read directly from the equipment. In calculation of the delay, both delays shall be included. In some other systems, the delays $\Delta t1$ and $\Delta t1'$ are not fixed, so they shall be excluded during calculation. It may also be possible that part of both delays is fixed, and then during calculation, only the fixed part of delay is included;

(2) a delay of a CO analog transmitting circuit 203 denoted by $\Delta t2$ and a delay of a CPE analog receiving circuit 205 denoted by $\Delta t2'$. Both of the delays $\Delta t2$ and $\Delta t2'$ occur on the devices, and can be obtained in the factory or through information exchange between the CPE and the CO; and (3) a delay of a symbol on a twisted pair 204 from the CO to the CPE denoted by $\Delta t3$, which is unknown.

Figure 5:
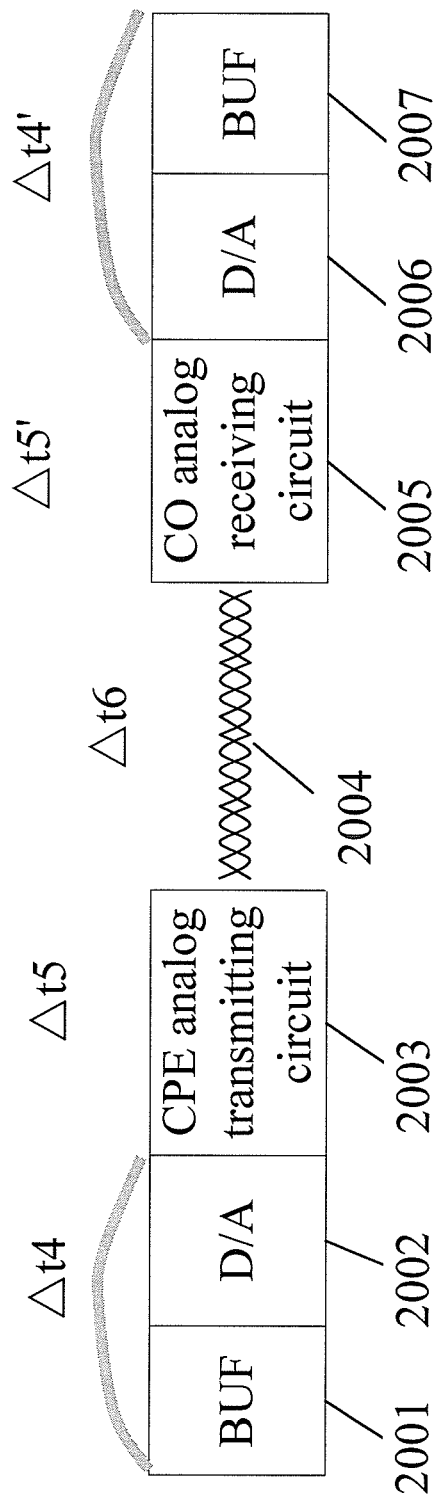
FIG. 5 is a schematic diagram identifying the elements constituting an upstream propagation delay.

A propagation delay from the CPE to the CO is shown in FIG. 5 and includes:

(1) a delay of a CPE digital transmitting circuit denoted by $\Delta t4$, which includes a delay of a CPE BUF 2001 and a delay of a CPE D/A 2002; and a delay of a CO digital receiving circuit denoted by $\Delta t4'$, which includes a delay of a CO D/A 2006 and a delay of a BUF 2007. In some systems, both of the delays $\Delta t4$ and $\Delta t4'$ are fixed and can be read directly from the equipment. In some other systems, both of the delays are not fixed, and then during calculation, both of the delays are not included;

(2) a delay of a CPE analog transmitting circuit 2003 denoted by $\Delta t5$ and a delay of a CO analog receiving circuit 2005 denoted by $\Delta t5'$. Because both of the delays $\Delta t5$ and $\Delta t5'$ occur on the devices, they can be obtained in the factory or through information exchange between the CO and the CPE; and (3) a delay of a signal on a twisted pair 2004 from the CPE to the CO denoted by $\Delta t6$, which is unknown.

The CO transmits the delays $\Delta t1$, $\Delta t2$, $\Delta t4'$, and $\Delta t5'$ to the CPE via a message channel, or pre-stored data is obtained by the CPE.

In step 60, the CPE calculates an offset between a clock of the CPE and a clock of the CO, and adjusts the clock of the CPE according to the offset.

The CPE calculates the offset between the clock of the CPE and the clock of the CO according to:

Offset=$Ts1-Tm2$-Delay1, and

Offset=$Tm2-Ts2$+Delay2.

During the calculation process, the CPE establishes a calculation model and splits Delay1 and Delay2. The CPE stores the mathematic relationship between Delay1 and Delay2, for example, the proportion of $\Delta t3=0.9\Delta t6$ or $\Delta t6=0.9\Delta t3$. The proportion can be obtained through statistics. The Offset can be obtained with the following equations:

Offset=$Ts1-Tm1$-Delay1=$Ts1-Tm1-(\Delta t1+\Delta t2+\Delta t3+\Delta t1'+\Delta t2')$ Offset=$Ts2-Tm2$+Delay2=$Ts2-Tm2+(\Delta t4+\Delta t5+\Delta t6+\Delta t5'+\Delta t4')$ or Offset=$Ts1-Tm1$-Delay1=$Ts1-Tm1-(\Delta t2+\Delta t3+\Delta t2')$ Offset=$Ts2-Tm2$+Delay2=$Ts2-Tm2+(\Delta t5+\Delta t6+\Delta t5')$ The delays $\Delta t3$ and $\Delta t6$ are approximately identical or have a proportion relationship. Assume that the delays $\Delta t3$ and $\Delta t6$ are approximately identical. The Offset can be estimated by the following equation:

Offset=$(Ts1-Tm1-(\Delta t1+\Delta t2+\Delta t1'+\Delta t2')+Ts2-Tm2+(\Delta t4+\Delta t5+\Delta t4'+\Delta t5'))/2$ or Offset=$(Ts1-Tm1-(\Delta t2+\Delta t2')+Ts2-Tm2+(\Delta t5+\Delta t5'))/2$ The delays Delay1 and Delay2 can be obtained with the estimated Offset:

Delay1=$Ts1-Tm1$-Offset

Delay2=$Ts2-Tm2$+Offset

After having obtained the offset between the clock of the CPE and the clock of the CO, the CPE obtains the time value of the local clock and adjusts the time of local clock according to the obtained local clock time and the offset.

Figure 6:
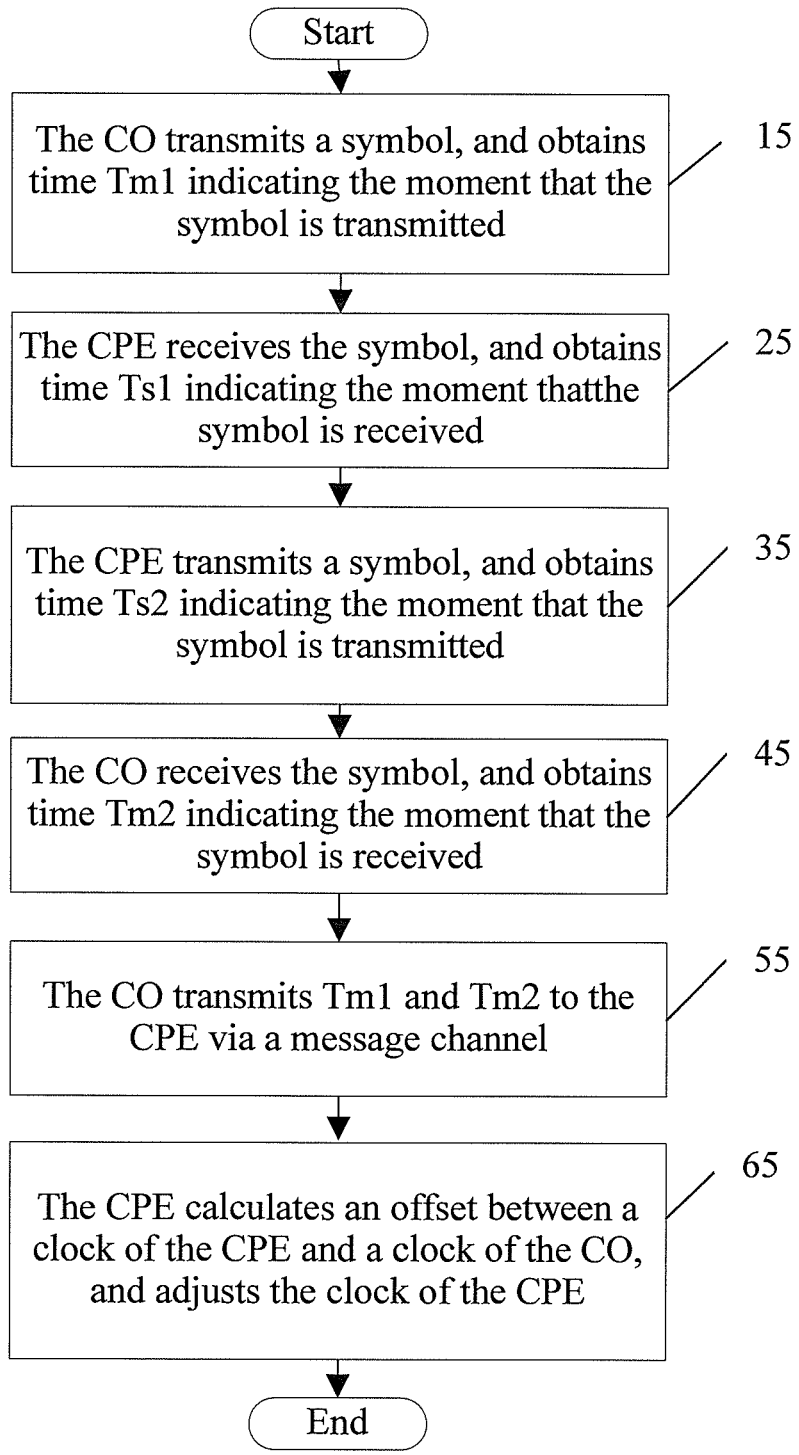
FIG. 6 is a flowchart of a synchronizing method according to a second embodiment of the present invention.

In the above embodiments, the CPE first transmits a symbol, and then the CO receives the symbol and further transmits a symbol. In the actual monitoring process, it is also feasible that the CO transmits a symbol and then the CPE receives the symbol and further transmits a symbol. The latter case will be described in the following second embodiment, a specific process of which is shown in FIG. 6.

In step 15, the CO transmits a second symbol, and obtains time Tm1 indicating the moment that the second symbol is transmitted.

During the initialization, the CO transmits a second symbol. When a sample at a specific position of the second symbol is written into a buffer by the CO or read from the buffer by a D/A module of the CO, an action of obtaining time stamps is triggered to read a time value of a local clock of the CO and obtain a time stamp Tm1. The second symbol may be a DMT frame. A specific point, at which the action of obtaining time stamps is triggered, is also determined through negotiation between the CO and the CPE. Any position in the second symbol may be used as a specific point. Hereinafter, a beginning position of the second symbol is taken as an example in this embodiment.

In step 25, the CPE receives the second symbol transmitted by the CO, and obtains exact time Ts1 indicating the moment that the second symbol is received.

When a sample at the beginning position of the second symbol is written into the buffer by the CPE or read from the buffer by an A/D module, an action of obtaining time stamps is triggered to obtain a time value of the local clock of the CPE denoted by Ts1'. Because the CPE calculates a frame boundary by means of a certain algorithm, an error may be introduced when the beginning position is calculated by means of the algorithm. In this case, the time Ts1' needs to be corrected by the CPE. The correction method used here is the same as that of the CPE in the first embodiment.

In step 35, the CPE transmits a first symbol, and obtains time Ts2 indicating the moment that the first symbol is transmitted by the CPE.

During the initialization, the CPE transmits a first symbol, which may also be a DMT frame. When a sample at a specific position of the first symbol is written into the buffer or read from the buffer by a D/A module, an action of obtaining time stamps is trigged by the CPE to read a time value of the local clock of the CPE denoted by Ts2. A specific point, at which the action of obtaining time stamps is triggered, is also determined through negotiation between the CO and the CPE. Any position in the first symbol may be used. Hereinafter, a beginning position of the first symbol is taken as an example in this embodiment.

In step 45, the CO receives the first symbol transmitted by the CPE, and obtains exact time Tm2 indicating the moment that the first symbol is received.

The CO receives the first symbol transmitted by the CPE. When a sample at the beginning position of the first symbol is written into the buffer or read from the buffer by an A/D module, an action of obtaining time stamps is triggered to read a time value of a local clock of CO denoted by Tm2'. Because the CO calculates a frame boundary by means of a certain algorithm, the time stamp Tm2' needs to be corrected by the CO. The correction method used herein is to the same as that of the CO in the first embodiment.

In step 55, the CPE obtains the time Tm1 and Tm2 obtained by the CO.

The CO transmits the time Tm1 and Tm2 to the CPE via a message channel.

The CPE obtains a delay of the CO and a delay of the CPE:

(1) a delay of the CO digital transmitting circuit denoted by $\Delta t1$, which includes a delay of a CO BUF 201 and a delay of a D/A 202; and a delay of the CPE digital receiving circuit denoted by $\Delta t1'$, which includes a delay of a CPE BUF 207 and a delay of a D/A 206. In some systems, both of the delay are fixed and can be read directly from the equipment. In calculation of the propagation delay, both of the delays shall be included. In some other systems, both of the delay are not fixed, so they shall be excluded during calculation. It may also be possible that part of the two delays is fixed, and then during calculation, only the fixed part is included;

(2) a delay of a CO analog transmitting circuit 203 denoted by $\Delta t2$ and a delay of a CPE analog receiving circuit 205 denoted by $\Delta t2'$. The delays t2 and $\Delta t2'$ both occur in the equipment, and can be obtained in the factory or through information exchange between the CPE and the CO;

(3) a delay of a symbol on a twisted pair 204 from the CO to the CPE denoted by $\Delta t3$, which is unknown.

A propagation delay from the CPE to the CO is shown in FIG. 5 and includes:

(1) a delay of the CPE digital transmitting circuit denoted by $\Delta t4$, which includes a delay of a CPE BUF 2001 and a delay of a CPE D/A 2002; and a delay of the CO digital receiving circuit denoted by $\Delta t4'$, which includes a delay of a CO D/A 2006 and a delay of a BUF 2007. In some systems, both of the delays are fixed and can be read directly from the equipment. In some other systems, both of the delays are not fixed, and then during calculation, the two delays are not included;

(2) a delay of a CPE analog transmitting circuit 2003 denoted by $\Delta t5$ and a delay of a CO analog receiving circuit 2005 denoted by $\Delta t5'$. Because the delays $\Delta t5$ and $\Delta t5'$ both occur on the devices, they can be obtained in the factory or through information exchange between the CO and the CPE;

(3) a delay of a signal on a twisted pair 2004 from the CPE to the CO denoted by $\Delta t6$, which is unknown.

The CO transmits the delays $\Delta t1$, $\Delta t2$, $\Delta t4'$, and $\Delta t5$ to the CPE via a message channel; or alternatively, the CPE obtains pre-stored data and thus the CO may also not transmit the information.

In step 65, the CPE calculates an offset between a clock of the CPE and a clock of the CO Offset, and adjusts the time of the CPE clock according to this offset.

The CPE calculates the offset according to the following equations:

Offset=$Ts1-Tm2$-Delay1, and

Offset=$Ts2-Tm2$+Delay2.

During the calculation process, the CPE establishes a calculation model and splits Delay1 and Delay2. The CPE stores the mathematic relationship between Delay1 and Delay2, for example, the proportion of $\Delta t3=0.96t6$ or $\Delta t6=0.9\Delta t3$. The specific mathematic relationship can be obtained through statistics. The Offset is obtained with the following equations:

Offset=$Ts1-Tm1$-Delay1=$Ts1-Tm1-(\Delta t1+\Delta t2+\Delta t3+\Delta t1'+\Delta t2')$ Offset=$Ts2-Tm2$+Delay2=$Ts2-Tm2+(\Delta t4+\Delta t5+\Delta t6+\Delta t5'+\Delta t4')$ or $$\text{Offset} = Ts1 - Tm1 - \text{Delay1} = Ts1 - Tm1 - (\Delta t2 + \Delta t3 + \Delta t2')$$

$$\text{Offset} = Ts2 - Tm2 + \text{Delay2} = Ts2 - Tm2 + (\Delta t5 + \Delta t6 + \Delta t5')$$

Because the delays $\Delta t3$ and $\Delta t6$ are approximately identical or have a proportion relationship, the Offset can be estimated.

After the Offset is obtained, the related delays Delay1 and Delay2 can be obtained:

$$\text{Delay1} = Ts1 - Tm1 - \text{Offset}$$

$$\text{Delay2} = Ts2 - Tm2 + \text{Offset}$$

After having obtained the offset between the clock of the CPE and the clock of the CO, the CPE obtains a time of the local clock of the CPE, and adjusts the time of the local clock according to the obtained local clock time and the estimated offset.

A third embodiment of the present invention provides a method for time synchronization of an xDSL. The method is applicable to the case that the delays Delay1 and Delay2 can be obtained by means of SELT or DELT or other ways. The method includes the following steps.

In step 1, the CO transmits a symbol, and obtains time Tm1 indicating the moment that the symbol is transmitted (or the CPE transmits a symbol, and obtains time Ts2 indicating the moment that the symbol is transmitted), and this symbol may be a DMT frame.

In an initialization stage, the CO transmits the symbol. When the CO writes data sampled at a specific position of this symbol into a buffer or a D/A module of the CO reads the data sampled at the specific position of this symbol from the buffer, the CO triggers a time marking action, reads local clock time of the CO and obtains the time Tm1. A specific point, at which the time marking action is triggered, is also determined through negotiation between the CO and the CPE, and any position in this symbol may be used. Hereinafter, a starting position of this symbol is taken as an example in this embodiment.

In step 2, the CPE receives the symbol transmitted by the CO, and obtains receiving time Ts1 (or the CO receives the symbol transmitted by the CPE, and obtains time Tm2 indicating the moment that this symbol is received).

When the CPE writes data sampled at the starting position of this symbol into the buffer or an A/D module reads the data sampled at the starting position of this symbol from the buffer, the CPE triggers the time marking action and reads the local time Ts1' of the CPE. Because the CPE calculates a frame boundary by means of a certain algorithm, the starting position calculated by means of the algorithm may have an error. In this case, the time Ts1' needs to be corrected by the CPE. The correction method is the same as that of the CPE in the first embodiment.

In step 3, the CPE obtains the time Tm1 transmitted by the CO (or the CPE obtains the time Tm2 transmitted by the CO).

The CO transmits the time Tm1 (or the time Tm2) to the CPE via a message channel.

In step 4, the CPE calculates an offset between a clock of the CPE and a clock of the CO according to Offset=Ts1−Tm1−Delay1 or Offset=Ts2−Tm2+Delay2.

Because Delay1 (or Delay2) has been measured, the offset can be solved.

In step 4, the CPE obtains a time value of the local clock, and adjusts the time of the local clock according to the obtained time of the local clock and the offset.

A fourth embodiment of the present invention provides a method for time synchronization of a DSL. Because a delay exists due to the processing of the equipment, the delay of equipment should be taken into account when the propagation delay of a symbol is calculated. In this way, the delay of CO equipment may not be needed when Offset is calculated by the CPE. Specific steps are as follows:

In a first step, the CO transmits a second symbol, and obtains time indicating the moment that the second symbol is transmitted.

During the initialization, when a sample at a beginning position of the second symbol is written into a buffer by the CO or read from the buffer by the CO, an action of obtaining time stamps is triggered to read the time of the local clock Tm1.

The CO equipment obtains a CO digital transmitting delay $\Delta t1$ and an analog transmitting delay $\Delta t2$, and processes the time when the second symbol is transmitted by the CO equipment. Specifically, Tm1=Tm1+$\Delta t1$+$\Delta t2$; and if the digital transmitting delay is not fixed, it can be excluded and in this case, Tm1=Tm1+$\Delta t2$.

In a second step, the CPE receives the second symbol, and obtains time indicating the moment that the second symbol is received by the CPE.

When a sample at the beginning position of the second symbol is written into the buffer by CPE or read from the buffer by an A/D module, an action of obtaining time stamps is triggered by the CPE to read a time value of the local clock of the CPE denoted by Ts1'. Because the CPE calculates a frame boundary by means of a certain algorithm, an error may be introduced when the beginning position is calculated by means of the algorithm. In this case, the time Ts1' needs to be corrected by the CPE, and the correction method used herein is the same as that of the CPE in the first embodiment.

In a third step, the CPE transmits a first symbol, and obtains time indicating the moment that the first symbol is transmitted.

During the initialization, the CPE transmits the first symbol. When a sample at a specific position of the first symbol is written into the buffer by the CPE or read a sample at the specific position of this symbol from the buffer by a D/A module, an action of obtaining time stamps is triggered to read the time of the local clock Ts2.

In a fourth step, the CO receives the first symbol, and obtains time indicating the moment that the first symbol is received.

The CO receives the first symbol transmitted by the CPE. When a sample at a beginning position of the first symbol is written into the buffer by the CO or read a sample at the specific position of this symbol from the buffer by an A/D module, an action of obtaining time stamps is triggered to read the time value of the local clock Tm2'. Because the CO calculates the frame boundary by means of a certain algorithm, an error may be introduced when the beginning position is calculated by means of the algorithm. In this case, the read time Tm2' needs to be corrected by the CO, and the correction method used here is the same as that in the first embodiment.

A specific point, at which the action of obtaining time stamps is triggered, is determined through negotiation between the CO and the CPE. Any position in the first symbol may be used, for example, the beginning position of the first symbol.

The CO obtains a delay of the CO digital receiving circuit denoted by $\Delta t4$ and a delay of the analog receiving circuit denoted by $\Delta t5$, and processes the time stamps indicating the moment that the first symbol is received by the CO equipment. Specifically, Tm2=Tm2−Δt4−Δt5. If the digital receiving delay is not fixed, it can be excluded and therefore Tm2=Tm2−Δt5.

In a fifth step, the CO transmits the time Tm1 and the time Tm2 to the CPE via a message channel, and the CPE calculates an offset between a clock of the CPE and a clock of the CO.

The CPE obtains a delay of the digital receiving circuit Δt1′, a delay of an analog receiving circuit Δt2′, a delay of the digital transmitting circuit Δt4′, and a delay of the analog transmitting circuit Δt5′ of the CPE.

The CPE calculates the offset according to:

Offset=$Ts1-Tm1-$Delay1=$Ts1-Tm1-(\Delta t1'+\Delta t2'+\Delta t3)$, and

Offset=$Ts2-Tm2+$Delay1=$Ts2-Tm2+(\Delta t4'+\Delta t5'+\Delta t6)$.

Alternatively, the digital receiving delay and the digital transmitting delay are not fixed and thus excluded, and then the CPE calculates the offset according to:

Offset=$Ts1-Tm1-$Delay1=$Ts1-Tm1-(\Delta t2'+\Delta t3)$, and

Offset=$Ts2-Tm2+$Delay1=$Ts2-Tm2+(\Delta t5'+\Delta t6)$.

In this process, the CPE may also process the time stamp Ts2 indicating the moment the second symbol transmitted and the time stamp Ts1 indicating the moment the first symbol received. For example, Ts1=Ts1−Δt1′−Δt2′ or Ts1=Ts1−Δt2′; Ts2=Ts2−t4′−Δt5′ or Ts2=Ts2−Δt5′. In this way, the CPE calculates the offset according to:

Offset=$Ts1-Tm1-$Delay1=$Ts1-Tm1-\Delta t3$, and

Offset=$Ts2-Tm2+$Delay1=$Ts2-Tm2+\Delta t6$.

The offset is estimated based on the proportion between Δt3 and Δt6 or the assumption that the delays Δt3 and Δt6 are approximately identical.

In a sixth step, the CPE adjusts the clock of the CPE according to the offset.

The CPE obtains the time value of the local clock, and adjusts the time of the local clock according to the obtained local lock time and the estimated offset.

In the above embodiments, it is the CPE that adjusts the local clock of CPE so that the clock of the CPE is synchronized with the clock of the CO. In practice, the CO may also adjust the local clock of CO so that the local clock of the CO is synchronized with the clock of the CPE, in which case the synchronization method is similar to the synchronization method in which the CPE adjusts the local clock.

The method described in the above embodiments takes the influence of the sampling rate into account, and can be executed for a plurality of times.

Figure 7:
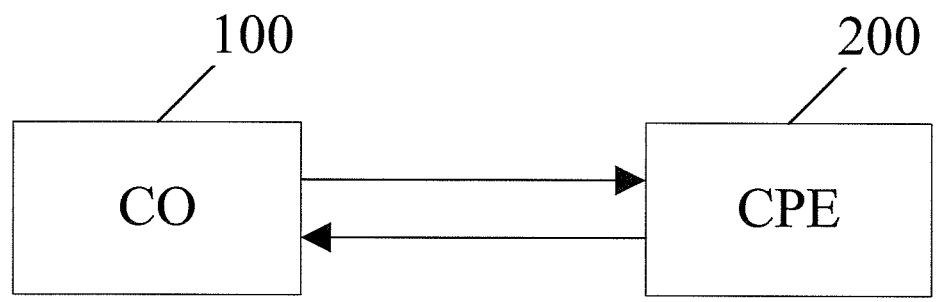
FIG. 7 is a schematic diagram of a system according to the present invention.

An embodiment of the present invention provides an xDSL communication system. As shown in FIG. 7, the communication system includes a CO 100 and a CPE 200.

The CPE 200 transmits a symbol, and obtains time Ts2 indicating the moment that the first symbol is transmitted. The CPE 200 transmits the first symbol, which is a DMT frame determined through negotiation between the CO 100 and the CPE 200 in an initialization stage. The CO 100 and the CPE 200 determine through negotiation a point in the first symbol as a reference point, which may be at any position in the first symbol. Hereinafter, a starting position of the first symbol is taken as an example.

When the CPE 200 writes data sampled at the starting position of the first symbol into a buffer or reads the data sampled at the starting position from the buffer, the CPE 200 triggers an action of obtaining time stamps and reads the time value of the local clock time Ts2 of the CPE 200.

The CO 100 receives the first symbol transmitted by the CPE 200, and obtains time Tm2 indicating the moment that the first symbol is received. When the CO 100 writes the data sampled at the starting position of the first symbol into the buffer or reads the data sampled at the starting position of the first symbol from the buffer, the CO 100 triggers the action of obtaining time stamps and reads the time value of the local clock time Tm2′. Because the CO 100 recovers a frame boundary by using a certain algorithm, an error may occur when the starting position of the first symbol is determined, and therefore the time needs to be corrected by the CO 100.

According to a phase difference between a receiving point phase and a check point phase of a sinusoidal signal (or a cosinoidal signal) in the first symbol, the CO 100 corrects the time stamp Tm2′ to the time stamp Tm2 indicating the moment that the CO 100 shall receive a check point. The receiving point is a signal point where the first symbol is initially received by the CO 100, and the aforesaid check point is a signal point where the first symbol is initially transmitted by the CPE 200.

When the CO 100 corrects the time Tm2′ according to one sinusoidal signal in the first symbol:

a phase of a corresponding point of this sinusoidal signal is fixed (for example, 0°, 45°, 90° or any other angle) when the CPE 200 triggers to obtain a time stamp, so during the correction process, the CO 100 may take this point as a check point and obtain a phase of the check point. In the following embodiments, 0° is taken as an example.

The CO 100 obtains a position in this sinusoidal signal where the CO 100 triggers to obtain the time stamp (which position is a receiving point where the first symbol is received by the CO 100), and calculates time taken from the phase of the receiving point to the phase of the check point. Then, the CO 100 adjusts the time Tm2′ into the time Tm2 according to the time.

The CO 100 may also carry out the correction by using a plurality of sinusoidal signals in this symbol. When the CPE 200 writes the starting position of the first symbol into the buffer or reads the starting position of the first symbol from the buffer, each of the sinusoidal signals in the first symbol is at a specific point. The CO 100 takes these points as check points, and knows respective phases of the check points in these sinusoidal signals when the CPE 200 made time stamps. For example, a check point in one of the sinusoidal signals is at 0°; one is at 90°; one is at 45°; and so on.

After receiving the first symbol, the CO 100 obtains the corresponding receiving point in each of the sinusoidal signals, and obtains the phase of the receiving point. Then, the CO 100 calculates time taken from the phase of the receiving point to the phase of the check point. The time is an offset of the time mark made by the CO 100 in each of the sinusoidal signals. The phases of these sinusoidal signals can be obtained through the FFT in the DMT system. In order to improve estimation accuracy and reduce influence of noises, the offset can be obtained through averaging after multiple calculations or through training a FEQ after the FFT. Because the FEQ makes compensation for an angle offset, the trained FEQ coefficient may also be used to estimate the angle offset of each of the sinusoidal signals. Because the DMT frame synchronization may have an error, there may be offsets between these angles obtained by the CO 100 and the CPE 200. These offsets have a linear relationship with frequencies of the sinusoidal signals, and a slope of the linear relationship directly reflects the frame synchronization error. The offset of each of the sinusoidal signals can be drawn on a coordinate, and these offsets are connected by a beeline; and a slope of the beeline is just the offset of the time stamps made by the CO 100 due to the synchronization error. Affected by such factors as noises, these angle errors obtained through actual calculation may not be strictly on a beeline. Accordingly, the CO 100 can calculate an optimal beeline for approximation according to a certain optimization algorithm (for example, the least square method). Therefore, the CO 100 calculates the error of the time stamps made by the CPE and corrects the time Tm2' to the time Tm2 according to this error.

Considering features of the xDSL system, these angle errors may also be obtained by using FEQ information, and then the time Tm2' is adjusted into the time Tm2 in a similar way.

The CO 100 transmits a second symbol, and obtains time Tm1 indicating the moment that the second symbol is transmitted. When the CO 100 writes data sampled at a starting position of the second symbol into a buffer or reads the data sampled at the starting position from the buffer, the CO 100 triggers an action of obtaining time stamps and reads the time value of the local clock time Tm1 of the CO 100. A specific point, at which the action of obtaining time stamps is triggered, is also determined through negotiation between the CO and the CPE, and any position in the second symbol may be used. In this embodiment, the starting position of the second symbol is taken as an example.

The CPE 200 receives the second symbol transmitted by the CO 100, and obtains time Ts1 indicating the moment that the second symbol is received. When the CPE 200 writes the data sampled at the starting position of the second symbol into the buffer or reads the data sampled at the starting position of the second symbol from the buffer, the CPE 200 triggers the action of obtaining time stamps and reads the time value of the local clock time Ts1'. Because the CPE 200 recovers a frame boundary by means of a certain algorithm, the CPE 200 corrects the time Ts1' to the time Ts1 in the same way as that of the CO 100.

The CO 100 transmits the time Tm1 and the time Tm2 to the CPE 200 via a message channel. If the CPE 200 does not store transmission delay and reception delay of the CO 100, the CO 100 transmits, through interaction with the CPE 200, the transmission delay and the reception delay of the CO 100 to the CPE 200 via the message channel.

The transmitting delay and the receiving delay of the CO 100 includes a delay $\Delta t1$ of the digital transmitting circuit, a delay $\Delta t2$ of the analog transmitting circuit, a delay $\Delta t5'$ of the analog receiving circuit, and a delay $\Delta t4'$ of the digital receiving circuit.

The CPE 200 obtains the transmission delay and the reception delay of the CPE 200, which include a delay $\Delta t1'$ of the digital transmitting circuit, a delay $\Delta t2'$ of the analog transmitting circuit, a delay $\Delta t5$ of the analog receiving circuit, and a delay $\Delta t4$ of the digital receiving circuit. These delays can be read directly from the CPE 200.

The CPE 200 calculates an offset between a clock of the CPE 200 and a clock of the CO 100 according to Ts1, Ts2, Tm1, Tm2, the delay of the CO 100, and the delay of the CPE 200.

Specifically, the CPE 200 calculates the offset according to:

$$\text{Offset} = Ts1 - Tm1 - \text{Delay1} = Ts1 - Tm1 - (\Delta t1 + \Delta t2 + \Delta t3 + \Delta t1' + \Delta t2')$$

$$\text{Offset} = Ts2 - Tm2 + \text{Delay2} = Ts2 - Tm2 + (\Delta t4 + \Delta t5 + \Delta t6 + \Delta t5' + \Delta t4')$$

or $$\text{Offset} = Ts1 - Tm1 - \text{Delay1} = Ts1 - Tm1 - (\Delta t2 + \Delta t3 + \Delta t2')$$

$$\text{Offset} = Ts2 - Tm2 + \text{Delay2} = Ts2 - Tm2 + (\Delta t5 + \Delta t6 + \Delta t5'),$$

wherein the CPE 200 stores therein the mathematic relationship between the delay Delay1 and the delay Delay2. Specifically, it can be known through statistics that the delay $\Delta t3$ and the delay $\Delta t6$ are approximately equal to each other or have a ratio relationship, for example, $\Delta t3 = 0.9 \Delta t6$ or $\Delta t6 = 0.9 \Delta t3$.

After obtaining the offset, the CPE 200 obtains a time value of the local clock, and adjusts the local clock time according to the obtained local clock time and the offset.

In the above communication system, it is the CPE 200 that adjusts the local clock time so that the local clock of the CPE 200 is synchronized with the clock of the CO 100. Alternatively, the CO 100 may also adjust the clock of the CO 100 so that the clock of the CPE 200 is synchronized with the clock of the CO 100, the synchronization process of which is the same as the synchronization process in which the clock of the CPE 200 is adjusted.

Figure 8:
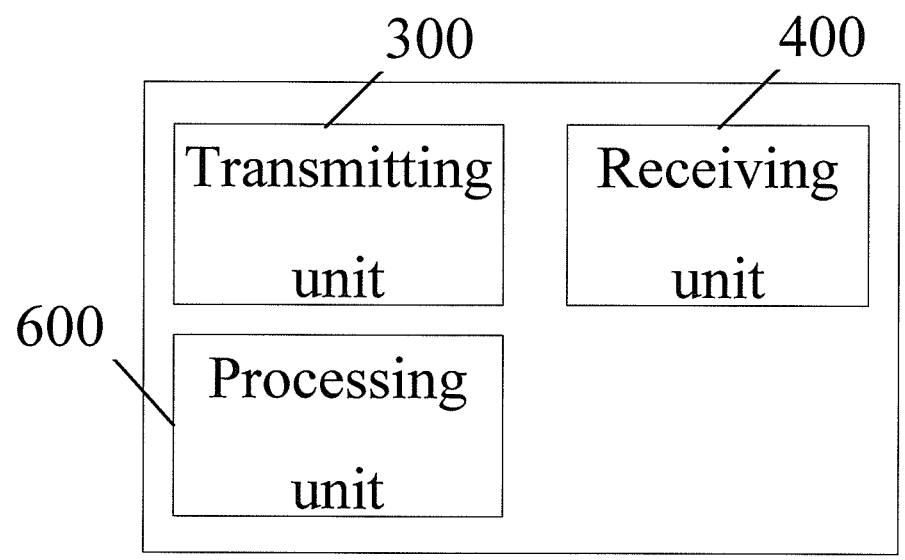
FIG. 8 is a schematic diagram of an apparatus according to the present invention.

The present invention further provides an xDSL apparatus, which can be used for the CO and the CPE. As shown in FIG. 8, the apparatus includes a transmitting unit 300, a receiving unit 400 and a processing unit 600.

The transmitting unit is configured to transmit a first symbol and obtain time Ts2 indicating the moment that the first symbol is transmitted.

The receiving unit is configured to receive a second symbol transmitted by a second apparatus and obtain time Ts1 indicating the moment that the second symbol is received; and obtain time Tm2 indicating the moment that the first symbol is received by the second apparatus and time Tm1 indicating the moment that the second symbol is transmitted by the second apparatus.

The processing unit is configured to obtain a delay of the DSL apparatus, calculate an offset between a clock of the DSL apparatus and a clock of the second apparatus according to Ts1, Ts2, Tm1, Tm2, and the delay of the DSL apparatus, and adjust the clock of the DSL apparatus according to the offset.

Specifically, the transmitting unit 300 transmits the first symbol, and obtains the time Ts2 indicating the moment that the first symbol is transmitted. The first symbol may be a training signal transmitted during an initialization stage, and this signal may be a DMT frame.

When the transmitting unit 300 writes data sampled at a starting position of the first symbol into a buffer or reads the data sampled at the starting position of the first symbol from the buffer, the transmitting unit 300 triggers an action of obtaining time stamps and reads the local time Ts2.

The receiving unit 400 receives the second symbol transmitted by the opposite terminal and obtains the time Ts1 indicating the moment that the second symbol is received. The second symbol may be a training signal transmitted during the initialization stage.

The receiving unit 400 further includes an obtaining module and a correcting module. The obtaining module receives the second symbol, obtains time Ts1' of the clock of the DSL apparatus, and obtains the time Tm2 indicating the moment that the first symbol is received by the second apparatus and the time Tm1 indicating the moment that the second symbol is transmitted by the second apparatus.

The correcting module, according to a phase difference between a receiving point phase and a check point phase of a signal in the second symbol, corrects the time stamp Ts1' to the time stamp Ts1 indicating the moment that the obtaining module shall receive a check point, and obtains the time stamp Ts1 for use as time indicating the moment that the second symbol is received by the obtaining module. The receiving point is a signal point where the second symbol is initially received by the obtaining module, and the check point is a signal point where the second symbol is initially transmitted by the second apparatus.

When the obtaining module writes data sampled at a starting position of the second symbol into the buffer or reads the data sampled at the starting position of the second symbol from the buffer, the obtaining module triggers an action of obtaining time stamps and reads the time value of the local clock time Ts1'. Because a boundary of the second symbol is recovered by means of a certain algorithm, an error may occur when the boundary is positioned. Accordingly, the correcting module, according to a phase difference between a receiving point phase and a check point phase of a signal in the second symbol, corrects the time stamp Ts1' to the time stamp Ts1 indicating the moment that the obtaining module shall receive a check point.

The correcting module obtains a position in a sinusoidal signal where the module triggers to obtain the time stamp, takes this position as a receiving point, and calculates time taken from the phase of the receiving point to the phase of the check point. Then according to the time, the correcting module corrects the time Ts1' into the time Ts1.

The correcting module may also use a plurality of sinusoidal signals in the second symbol. The correcting module knows respective angles of the corresponding points (i.e., the check points) in these sinusoidal signals when the second apparatus makes time stamps. For example, a check point in one of the sinusoidal signals is at 0°; one is at 90°; one is at 45°; and so on. Hence, after the second symbol is received by the obtaining module, the correcting module obtains the positions where the obtaining module makes the time stamps, which are receiving points, and calculates the time taken from the phase of each of the receiving points to the phase of a corresponding check point. The angles of these sinusoidal signals can be obtained through the FFT in the DMT system. In order to improve estimation accuracy and reduce influence of noises, the offset can be obtained through averaging after multiple calculations or through training a FEQ after the FFT. Because the FEQ makes compensation for the angle offset, the trained FEQ coefficient may also be used to estimate the angle offset of each of the sinusoidal signals. Because the DMT frame synchronization may have an error, there may be offsets between the angles obtained by the correcting module and the angles obtained by the opposite apparatus. These offsets have a linear relationship with frequencies of the sinusoidal signals, and a slope of the linear relationship directly reflects the frame synchronization error. Therefore, the correcting module can plot the offset of each of the sinusoidal signals on a coordinate system, and connect these offsets into a beeline, a slope of which is just the offset of the time stamps made by the CPE due to the synchronization error. Affected by such factors as noises, these angle errors obtained through actual calculation may not be strictly on a beeline. The CPE can calculate an optimal beeline for approximation according to a certain optimization algorithm (for example, the least square method). The correcting module calculates the error of the CPE time stamp, and corrects the time Ts1' into the time Ts1 according to this error.

The correcting module may also reside on the communication apparatus, being independent of the receiving unit 400.

The receiving unit 400 may also receive, via a message, channel information transmitted by the second apparatus, including the time Tm2 indicating the moment that the first symbol is received by the second apparatus, the time Tm1 indicating the moment that the second symbol is transmitted by the second apparatus, and the transmission delay and the reception delay of the second apparatus. The transmission delay and the reception delay of the second apparatus include: a delay $\Delta t1$ of the digital transmitting circuit, a delay $\Delta t2$ of the analog transmitting circuit, a delay $\Delta t5'$ of the analog receiving circuit, and a delay $\Delta t4'$ of the digital receiving circuit.

The second apparatus may also process the time Tm2 and the time Tm1 by using the delay data of the second apparatus. In this way, the second apparatus only needs to transmit the time Tm1 and the time Tm2 that are processed to the DSL apparatus; for example, Tm1=Tm1+$\Delta t1$+$\Delta t2$ or Tm1=Tm1+$\Delta t2$, Tm2=Tm2−$\Delta t5$−$\Delta t4$ or Tm2=Tm2−$\Delta t5$.

The DSL apparatus may also process the time Ts1 and the time Ts2; i.e., Ts1=Ts1−$\Delta t1'$−$\Delta t2'$ or Ts1=Ts1−$\Delta t2'$; Ts2=Ts2−$\Delta t4'$−$\Delta t5'$ or Ts2=Ts2−$\Delta t5'$.

The processing unit 600 obtains the delay of the DSL apparatus, calculates an offset between the clock of the local apparatus and the clock of the second apparatus according to the time Ts2 obtained by the transmitting unit, Ts1, Tm2, Tm1 obtained by the receiving unit, and the delay of the DSL apparatus, and adjusts the clock of the DSL apparatus according to the offset.

The delay of the DLS apparatus includes: a delay $\Delta t1'$ of the digital transmitting circuit, a delay $\Delta t2'$ of the analog transmitting circuit, a delay $\Delta t5$ of the analog receiving circuit and a delay $\Delta t4$ of the digital receiving circuit, all of which can be directly obtained when the DSL apparatus is delivered from the factory.

The processing unit 600 calculates the offset according to:

$$\text{Offset}=Ts1-Tm1-\text{Delay}1=Ts1-Tm1-(\Delta t1+\Delta t2+\Delta t3+\Delta t1'+\Delta t2')$$

$$\text{Offset}=Ts2-Tm2+\text{Delay}2=Ts2-Tm2+(\Delta t4+\Delta t5+\Delta t6+\Delta t5'+\Delta t4')$$

or $$\text{Offset}=Ts1-Tm1-\text{Delay}1=Ts1-Tm1-(\Delta t2+\Delta t3+\Delta t2')$$

$$\text{Offset}=Ts2-Tm2+\text{Delay}2=Ts2-Tm2+(\Delta t5+\Delta t6+\Delta t5');$$

or the DSL apparatus and the second apparatus, after processing the transmitted/received symbol, calculate the offset according to:

$$\text{Offset}=Ts1-Tm1-\text{Delay}1=Ts1-Tm1-\Delta t3, \text{ and}$$

$$\text{Offset}=Ts2-Tm2+\text{Delay}1=Ts2-Tm2+\Delta t6.$$

The processing unit 600 reads the local clock time, and adjusts the local time according to the local clock time and the offset.

The second apparatus may be the CO or the CPE, and the DSL apparatus may also be used as the CO or the CPE.

As can be seen from the above embodiments, according to the present invention, by correcting the local time corresponding to the time stamps, the local time can be read by the receiver exactly, and the offset between the clock of the CPE and the clock of the CO can be calculated so that the clock of the CPE can be adjusted according to the offset to achieve synchronization between the clock of the CO and the clock of the CPE.

It can be understood by those of ordinary skill in the art that, all or part of the steps in the methods of the above embodiments can be performed by a program running on related hardware. The program can be stored in a computer-readable storage medium, including a read-only memory (ROM), a random access memory (RAM), a magnetic disk or a compact disk (CD).

The above disclosure is only several embodiments of the present invention. However, the present invention is not only limited to these embodiments, and any modifications that may occur for people skilled in the art shall fall into the protection scope of the present invention.

What is claimed is:

1. A method for time synchronization of a digital subscriber line (DSL), the method comprising:
   receiving, by a first apparatus, a second symbol transmitted by a second apparatus, and obtaining a time Ts1 at which the second symbol is received by the first apparatus;
   transmitting, by the first apparatus, a first symbol to the second apparatus, and obtaining a time Ts2 at which the first symbol is transmitted by the first apparatus;
   obtaining, by the first apparatus, a time Tm2 at which the first symbol is received by the second apparatus and a time Tm1 at which the second symbol is transmitted by the second apparatus;
   calculating, by the first apparatus, an offset between a clock of the first apparatus and a clock of the second apparatus according to the time Ts1, the time Ts2, the time Tm1 and the time Tm2;
   adjusting, by the first apparatus, the clock of the first apparatus with the offset to synchronize with the clock of the second apparatus; and
   obtaining a phase difference between a receiving point phase and a check point phase, wherein the receiving point is a position where a signal of the second symbol is received by the first apparatus and the check point is a position where the same signal of the second symbol is transmitted by the second apparatus;
   wherein the time Ts2 is a time at which a sample at a starting position of the first symbol is transmitted by the first apparatus, the time Tm2 is a time at which the same sample at the starting position of the first symbol is received by the second apparatus, the time Tm1 is a time at which a sample at a starting position of the second symbol is transmitted by the second apparatus, and the time Ts1 is a time at which the same sample at the starting position of the second DMT symbol is received by the first apparatus,
   wherein the offset is calculated based on an assumption that a downstream propagation delay and an upstream propagation delay of a twisted pair of the DSL are approximately identical.

2. The method according to claim 1, further comprising: adjusting the time Tm1 by adding a delay produced by the second apparatus.

3. The method according to claim 1, wherein the first symbol and the second symbol are discrete multi-tone (DMT) symbols.

4. The method according to claim 1, wherein the first apparatus is a customer premises equipment (CPE) and the second apparatus is a central office (CO) equipment.

5. The method according to claim 1, wherein the time Tm2 and the time Tm1 are sent to the first apparatus via a message channel.

6. The method according to claim 1, wherein the time Ts1, the time Ts2, the time Tm1 and the time Tm2 are obtained at the first apparatus endpoint of a twisted pair or the second apparatus endpoint of a twisted pair.

7. A method for time synchronization of a digital subscriber line (DSL), the method comprising:
   receiving, by a first apparatus, a second symbol transmitted by a second apparatus, and obtaining a time Ts1 at which the second symbol is received by the first apparatus;
   transmitting, by the first apparatus, a first symbol to the second apparatus, and obtaining a time Ts2 at which the first symbol is transmitted by the first apparatus;
   obtaining, by the first apparatus, a time Tm2 at which the first symbol is received by the second apparatus and a time Tm1 at which the second symbol is transmitted by the second apparatus;
   calculating, by the first apparatus, an offset between a clock of the first apparatus and a clock of the second apparatus according to the time Ts1, the time Ts2, the time Tm1 and the time Tm2; and
   adjusting, by the first apparatus, the clock of the first apparatus with the offset to synchronize with the clock of the second apparatus;
   wherein the time Ts2 is a time at which a sample at a starting position of the first symbol is transmitted by the first apparatus, the time Tm2 is a time at which the same sample at the starting position of the first symbol is received by the second apparatus, the time Tm1 is a time at which a sample at a starting position of the second symbol is transmitted by the second apparatus, and the time Ts1 is a time at which the same sample at the starting position of the second DMT symbol is received by the first apparatus,
   wherein the offset is calculated based on an assumption that a downstream propagation delay and an upstream propagation delay of a twisted pair of the DSL are approximately identical,
   wherein the obtaining by the first apparatus of the time Ts1 at which the second symbol is received comprises:
   reading, by the first apparatus, a time Ts1' at which the first apparatus receives a signal of the second symbol;
   correcting, by the first apparatus, the time Ts1' to the time Ts1 at which the first apparatus shall receive a check point according to a phase difference between a receiving point phase and a check point phase, wherein the receiving point is a position where the signal of the second symbol is received by the first apparatus and the check point is a position where the signal of the second symbol is transmitted by the second apparatus; and
   obtaining, by the first apparatus, the time Ts1 and using it as the time indicating the moment that the second symbol is received.

8. The method according to claim 7, wherein the step of correcting comprises:
   when a plurality of signals in the second symbol is used by the first apparatus, obtaining, by the first apparatus, a phase of a check point in each of the signals;
   obtaining, by the first apparatus, a phase of a receiving point in each of the signals;
   calculating, by the first apparatus, time taken from the phase of the receiving point to the phase of the check point in each of the signals, so as to obtain a plurality of time values;
   obtaining, by the first apparatus, an offset between time marks made by the first apparatus according to the plurality of time values; and
   correcting, by the first apparatus, the time Ts1' to the time Ts1 according to the offset.

9. The method according to claim 8, wherein the obtaining, by the first apparatus, the time Tm2 at which the first symbol is received by the second apparatus comprises:

reading, by the second apparatus, a time Tm2' at which the second apparatus receives a signal of the first symbol;

correcting, by the second apparatus, the time Tm2' to the time Tm2 at which the second apparatus shall receive a check point according to a phase difference between the phase at a receiving point and a check point, wherein the receiving point is a position where the signal of the first symbol is received by the second apparatus and the check point is a position where the signal of the first symbol is transmitted by the first apparatus; and obtaining, by the second apparatus, the time Tm2 and using it as the time indicating the moment that the first symbol is received.

10. The method according to claim 9, wherein the correcting, by the second apparatus, the time Tm2' to the time Tm2 comprises:

when using a plurality of signals in the first symbol, obtaining, by the second apparatus, a phase of a check point in each of the signals;

obtaining, by the second apparatus, a phase of a receiving point in each of the signals;

calculating, by the second apparatus, time taken from the phase of the receiving point to the phase of the check point in each of the signals, so as to obtain a plurality of time values;

obtaining, by the second apparatus, an offset between time marks made by the second apparatus according to the plurality of time values; and correcting, by the second apparatus, the time Tm2' to the time Tm2 according to the offset.

11. A digital subscriber line (DSL) apparatus, comprising:
a transmitting unit configured to transmit a first symbol and obtain a time Ts2 at which the first symbol is transmitted;
a receiving unit configured to:
 receive a second symbol transmitted by a network device and obtain a time Ts1 at which the second symbol is received;
 obtain a time Tm2 at which the first symbol is received by the network device and a time Tm1 at which the second symbol is transmitted by the network device; and
 obtain a phase difference between a receiving point phase and a check point phase, wherein the receiving point is a position where a signal of the second symbol is received by the DSL apparatus and the check point is a position where the same signal of the second symbol is transmitted by the network device; and
a processing unit configured to:
 calculate an offset between a clock of the DSL apparatus and a clock of the network device according to the time Ts1, the time Ts2, the time Tm1, and the time Tm2; and
 adjust the clock of the DSL apparatus according to the offset;
wherein the time Ts2 is a time at which a sample at a starting position of the first symbol is transmitted by the DSL apparatus, the time Tm2 is a time at which the same sample at the starting position of the first symbol is received by the network device, the time Tm1 is a time at which a sample at a starting position of the second symbol is transmitted by the network device, and the time Ts1 is a time at which the same sample at the starting position of the second symbol is received by the DSL apparatus,
wherein the offset is calculated based on an assumption that a downstream propagation delay and an upstream propagation delay of a twisted pair of the DSL are approximately identical.

12. The DSL apparatus according to claim 11, wherein the time Ts1, the time Ts2, the time Tm1 and the time Tm2 are obtained at the DSL apparatus endpoint of a twisted pair or the network device endpoint of a twisted pair.

13. The DSL apparatus according to claim 11, wherein the DSL apparatus is a customer premises equipment (CPE).

14. A digital subscriber line (DSL) apparatus, comprising:
a transmitting unit configured to transmit a first symbol and obtain a time Ts2 at which the first symbol is transmitted;
a receiving unit configured to:
 receive a second symbol transmitted by a network device and obtain a time Ts1 at which the second symbol is received; and
 obtain a time Tm2 at which the first symbol is received by the network device and a time Tm1 at which the second symbol is transmitted by the network device; and
a processing unit configured to calculate an offset between a clock of the DSL apparatus and a clock of the network device according to the time Ts1, the time Ts2, the time Tm1, and the time Tm2, and adjust the clock of the DSL apparatus according to the offset
wherein the time Ts2 is a time at which a sample at a starting position of the first symbol is transmitted by the DSL apparatus, the time Tm2 is a time at which the same sample at the starting position of the first symbol is received by the network device, the time Tm1 is a time at which a sample at a starting position of the second symbol is transmitted by the network device, and the time Ts1 is a time at which the same sample at the starting position of the second symbol is received by the DSL apparatus,
wherein the offset is calculated based on an assumption that a downstream propagation delay and an upstream propagation delay of a twisted pair of the DSL are approximately identical,
an obtaining module receives a signal of the second symbol, obtains a time Ts1' of the clock of the DSL apparatus, and obtains the time Tm2 at which the first symbol is received by the second apparatus and the time Tm1 at which the second symbol is transmitted by the network device; and
a correcting module corrects the time Ts1' to the time Ts1 at which the obtaining module shall receive a check point according to a phase difference between a receiving point phase and a check point phase, wherein the receiving point is a position where the signal of the second symbol is received by the obtaining module, the check point is a position where the signal of the second symbol is transmitted by the network device, and the correcting module obtains the time Ts1 and uses it as the time indicating the moment that the second symbol is received by the obtaining module.

15. The DSL apparatus according to claim 14, wherein the step of correcting, by the correcting module, the time Ts1' to the time Ts1 comprises:

when using a plurality of signals in the second symbol, obtaining, by the correcting module a phase of a check point in each of the signals;

obtaining, by the correcting module, a phase of a receiving point in each of the signals;

calculating, by the correcting module, time taken from the phase of the receiving point to the phase of the check point in each of the signals, so as to obtain a plurality of time values;

obtaining, by the correcting module, an offset of the time $Ts1'$ obtained by the obtaining module according to the plurality of time values; and correcting, by the correcting module, the time $Ts1'$ to the time $Ts1$ according to the offset.

16. A non-transitory computer readable medium that stores a computer program comprising computer executable instructions that, when executed, cause a device to implement the following:

receiving a second symbol transmitted by a second apparatus, and obtaining a time $Ts1$ at which the second symbol is received;

transmitting a first symbol to the second apparatus, and obtaining a time $Ts2$ at which the first symbol is transmitted from a first apparatus;

obtaining a time $Tm2$ at which the first symbol is received by the second apparatus and a time $Tm1$ at which the second symbol is transmitted by the second apparatus;

calculating an offset between a clock of the first apparatus and a clock of the second apparatus according to the time $Ts1$, the time $Ts2$, the time $Tm1$, and the time $Tm2$;

adjusting the clock of the first apparatus with the offset to synchronize with the clock of the second apparatus; and obtaining a phase difference between a receiving point phase and a check point phase, wherein the receiving point is a position where a signal of the second symbol is received by the first apparatus and the check point is a position where a signal of the second symbol is received by the first apparatus and the check point is a position where the same signal of the second symbol is transmitted by the second apparatus;

wherein the time $Ts2$ is a time at which a sample at a starting position of the first symbol is transmitted by the first apparatus, the time $Tm2$ is a time at which the same sample at the starting position of the first symbol is received by the second apparatus, the time $Tm1$ is a time at which a sample at a starting position of the second symbol is transmitted by the second apparatus, and the time $Ts1$ is a time at which the same sample at the starting position of the second symbol is received by the first apparatus, wherein the offset is calculated based on an assumption that a downstream propagation delay and an upstream propagation delay of a twisted pair of the DSL are approximately identical.

* * * * *